(12) United States Patent
Rhyu et al.

(10) Patent No.: US 10,659,519 B2
(45) Date of Patent: May 19, 2020

(54) METHOD AND APPARATUS FOR TRANSMITTING AND RECEIVING CONTENT

(71) Applicant: Samsung Electronics Co. Ltd., Suwon-si, Gyeonggi-do (KR)

(72) Inventors: Sung-Ryeul Rhyu, Yongin-si (KR); Kyung-Mo Park, Seoul (KR); Jae-Yeon Song, Seoul (KR); Sung-Oh Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 538 days.

(21) Appl. No.: 13/630,424

(22) Filed: Sep. 28, 2012

(65) Prior Publication Data

US 2013/0086213 A1    Apr. 4, 2013

(30) Foreign Application Priority Data

Sep. 29, 2011  (KR) .................. 10-2011-0099426
Oct. 13, 2011   (KR) .................. 10-2011-0104882

(51) Int. Cl.
*H04N 7/24*     (2011.01)
*H04N 7/52*     (2011.01)
(Continued)

(52) U.S. Cl.
CPC ............ *H04L 67/06* (2013.01); *H04H 20/95* (2013.01); *H04N 21/236* (2013.01);
(Continued)

(58) Field of Classification Search
CPC ..... H04L 67/06; H04L 65/602; H04L 65/605; H04L 67/108; H04L 67/2804;
(Continued)

(56) References Cited

U.S. PATENT DOCUMENTS 6,480,537 B1 * 11/2002 Agrawal .............. H04N 21/235
                                                                375/240
6,806,909 B1 * 10/2004 Radha .................. H04N 21/233
                                                                348/384.1
(Continued)

FOREIGN PATENT DOCUMENTS

CN         1650628 A      8/2005
CN       101558376 A     10/2009
(Continued)

OTHER PUBLICATIONS

Kyungmo Park and Gerard Fernando, Working Draft of MPEG Media Transport, International Organisation for Standardisation, Coding of Moving Pictures and Audio, ISO/IEC JTC1/SC29/WG11/N12169, Jul. 2011, 18 pages, Torino, Italy.
(Continued)

*Primary Examiner* — Hee Soo Kim
*Assistant Examiner* — Ho T Shiu
(74) *Attorney, Agent, or Firm* — Jefferson IP Law, LLP

(57) ABSTRACT

A method and apparatus for transmitting and receiving content is provided. A method for transmitting content in a transmitter includes generating a file with one or more packages including at least one asset, and transmitting the generated file to a terminal.

3 Claims, 15 Drawing Sheets

(51) Int. Cl.
  *H04L 29/06* (2006.01)
  *H04L 29/08* (2006.01)
  *G06F 15/16* (2006.01)
  *H04N 21/236* (2011.01)
  *H04H 20/95* (2008.01)
  *H04N 21/854* (2011.01)
  *H04N 21/643* (2011.01)
  *H04N 21/2381* (2011.01)

(52) U.S. Cl.
  CPC ... *H04N 21/85406* (2013.01); *H04N 21/2381* (2013.01); *H04N 21/23611* (2013.01); *H04N 21/64322* (2013.01)

(58) Field of Classification Search
  CPC ....... H04N 21/2381; H04N 21/234309; H04N 21/234327; H04N 21/23439; H04N 21/235; H04N 21/23611; H04N 21/85406
  See application file for complete search history.

(56) References Cited

U.S. PATENT DOCUMENTS

| | | | |
|---|---|---|---|
| 7,096,487 B1* | 8/2006 | Gordon | H04N 5/4401 348/E5.108 |
| 7,155,445 B1* | 12/2006 | Kling et al. | |
| 7,620,887 B1* | 11/2009 | Lubbers | G06F 11/3692 715/205 |
| 8,386,630 B1* | 2/2013 | Atzmon | 709/231 |
| 2001/0029457 A1* | 10/2001 | Shaffer et al. | 704/504 |
| 2002/0003811 A1* | 1/2002 | Herrmann | H04L 29/06 370/474 |
| 2004/0001091 A1* | 1/2004 | Kressin | H04L 12/1822 715/753 |
| 2004/0030798 A1 | 2/2004 | Andersson et al. | |
| 2005/0049998 A1* | 3/2005 | Ruhlow et al. | 707/1 |
| 2005/0151756 A1 | 7/2005 | Miyamoto et al. | |
| 2005/0165840 A1* | 7/2005 | Pratt | G06F 17/30017 |
| 2007/0047640 A1* | 3/2007 | Venna | H04N 21/2389 375/240.01 |
| 2007/0050834 A1 | 3/2007 | Royo et al. | |
| 2008/0205511 A1* | 8/2008 | Hannuksela | H04L 65/607 375/240.01 |
| 2008/0270913 A1 | 10/2008 | Singer et al. | |
| 2009/0006643 A1* | 1/2009 | Lee | H04N 21/23424 709/231 |
| 2009/0028142 A1 | 1/2009 | Schmidt et al. | |
| 2009/0067813 A1* | 3/2009 | Johnson | G11B 27/10 386/239 |
| 2010/0146538 A1 | 6/2010 | Cheong et al. | |
| 2010/0189256 A1 | 7/2010 | Doehla et al. | |
| 2010/0189424 A1* | 7/2010 | Doehla | H04N 21/85406 386/241 |
| 2010/0191709 A1 | 7/2010 | Kiyama et al. | |
| 2011/0116772 A1 | 5/2011 | Kwon et al. | |
| 2011/0231520 A1 | 9/2011 | Ha et al. | |
| 2011/0246660 A1* | 10/2011 | Bouazizi | H04L 65/4084 709/231 |
| 2011/0276712 A1* | 11/2011 | Narula | H04L 65/4092 709/231 |
| 2013/0044224 A1* | 2/2013 | Liao | H04N 17/004 348/192 |
| 2014/0325572 A1* | 10/2014 | Yie | H04H 60/73 725/74 |

FOREIGN PATENT DOCUMENTS

| | | |
|---|---|---|
| CN | 101731013 A | 6/2010 |
| CN | 101785278 A | 7/2010 |
| EP | 2 352 292 A1 | 8/2011 |
| EP | 2 723 085 A2 | 4/2014 |
| JP | 2000-333105 A | 11/2000 |
| JP | 2004-007533 A | 1/2004 |
| JP | 2005-198204 A | 7/2005 |
| JP | 2005-229587 A | 8/2005 |
| JP | 2006-129078 A | 5/2006 |
| KR | 10-2003-0060890 A | 7/2003 |
| KR | 10-2006-0039328 A | 5/2006 |
| KR | 10-2010-0066312 A | 6/2010 |
| KR | 10-2011-0053177 A | 5/2011 |
| WO | 03046912 A1 | 6/2003 |

OTHER PUBLICATIONS

Information Technology—Coding of Audio-Visual Objects, International Standard, ISO/IEC 14496-12, 3rd edition, Oct. 15, 2008, 120 pages, Switzerland.
Gun-Hee Lee et al, Efficient Method for Storage and Transmission of MPEG-2 Transport Stream based on ISO Base Media File Format, In: IEEK Summer Coference 2009, Jul. 2009, pp. 221-222.
XP030018665 "Technology under Considerations on MPEG Media Transport" Aug. 24, 2011.
XP030047833 "Response to CfPs on MPEG Media Transport(MMT)" Jan. 19, 2011.
XP050553205 3rd Generation Partnership Project; Technical Specification Group Services and System Aspects; Transparent end-to-end packet switched streaming service(PSS);3GPP file format(3GP) Jun. 17, 2011.
Youngkwon Lim, Review of w11792, AHG on MMT, ISO/IEC JTC1/SC29/WG11 m19989, Mar. 2011, Geneva, Switzerland.
Japanese Office Action dated Mar. 4, 2019, issued in a counterpart Japanese application No. 2018-128530.

* cited by examiner

METHOD AND APPARATUS FOR TRANSMITTING AND RECEIVING CONTENT

PRIORITY

This application claims the benefit under 35 U.S.C. § 119(a) of a Korean Patent Application filed on Sep. 29, 2011 in the Korean Intellectual Property Office and assigned Serial No. 10-2011-0099426, and a Korean Patent Application filed on Oct. 13, 2011 in the Korean Intellectual Property Office and assigned Serial No. 10-2011-0104882, the entire disclosure of which is hereby incorporated by reference.

BACKGROUND OF THE INVENTION

1. Field of the Invention

The present invention relates to a method and apparatus for transmitting and receiving content. More particularly, the present invention relates to a method and apparatus for transmitting and receiving content over a variety of heterogeneous networks.

2. Description of the Related Art

The International Organization for Standardization/International Electrotechnical Commission (ISO/IEC) has defined an ISO base file format as a standard file format used for multimedia services. The ISO base file format is a flexible and extensible file structure and is the basis of various media file formats. For example, Joint Photographic Experts Group (JPEG) 2000 and 3rd Generation Partnership Project (3GPP) file formats are based on the ISO base file format, while Moving Picture Experts Group (MPEG)-4 file format is an extended format of the ISO base file format.

A method is desired that can efficiently transmit multimedia content (content) including various types of media such as content of movies, news, etc. The content is transmitted on a package basis. To this end, a method is desired that can transmit content more efficiently using the packages.

SUMMARY OF THE INVENTION

Aspects of the present invention are to address at least the above-mentioned problems and/or disadvantages and to provide at least the advantages described below. An aspect of the present invention is to provide a content storage method and apparatus for efficiently transmitting content.

Another aspect of the present invention is to provide a content delivery method and apparatus for transmitting content over a variety of heterogeneous networks.

Another aspect of the present invention is to provide a method and apparatus for storing and transmitting content having a package structure.

In accordance with an aspect of the present invention, a method for transmitting content in a transmitter is provided. The method includes generating a file with one or more packages including at least one asset, and transmitting the generated file to a terminal.

In accordance with another aspect of the present invention, a method for receiving content in a terminal is provided. The method includes receiving a file, analyzing one or more packages included in the file and including at least one asset, and playing content based on the analysis results.

In accordance with another aspect of the present invention, an apparatus for transmitting content in a transmitter is provided. The apparatus includes a generator for generating a file with one or more packages including at least one asset, and a transmission unit for transmitting the generated file to a terminal.

In accordance with another aspect of the present invention, an apparatus for receiving content in a receiver is provided. The apparatus includes a reception unit for receiving a file, a package analysis unit for analyzing one or more packages included in the file and including at least one asset, and a playback unit for playing content based on the analysis results.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same elements, features and structures.

DETAILED DESCRIPTION OF EXEMPLARY EMBODIMENTS

Figure 1:
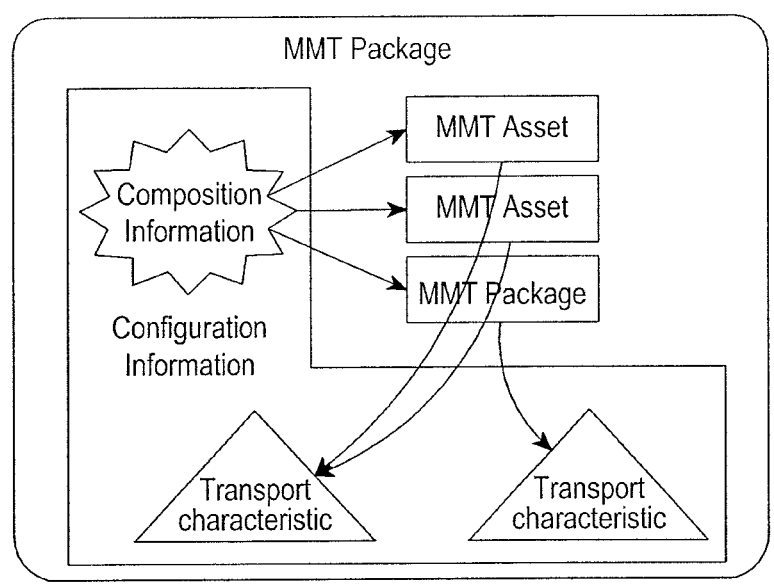
FIG. 1 shows a structure of an MPEG Media Transport (MMT) package according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the same terms as those defined by the MPEG Media Transport (MMT) standard will be used in the following detailed description, the standard and its defined terms are not intended to limit the scope of the preset invention, and it will be apparent to those of ordinary skill in the art that the present invention is applicable to any systems having the similar technical backgrounds.

Prior to a description of exemplary embodiments of the present invention, the terms to be used in the specification are defined as follows:

The Encapsulation functional area (E) defines the format for the encapsulation of encoded media data either to be stored on storage devices or to be carried as the payload of delivery protocols and networks.

The Delivery functional area (D) provides formats and functionalities that are needed for transferring encapsulated media data from one network entity to another.

The Control functional area (C) provides functionalities to control delivery and consumption of the media.

Media Fragment Unit

A generic container format, independent of any specific codec, that will carry the data units independently consumable by a media decoder.

Note: A Media Fragment Unit is composed of media fragment data and additional information such as media characteristics (e.g., loss-tolerance). For example, a Media Fragment Unit may be either a slice or a picture for video.

M-Unit

A generic container format, independent of any specific codec, that will carry one or more Access Units (AU). An M-unit is composed of one or more media fragment units. An M-unit may contain either timed data or non-timed data.

Note: An M-unit is composed of Media Fragment Unit data and additional information such as a timestamp for synchronization. M-Unit is data entity for processing by MMT Encapsulation functions.

MMT Asset

An MMT Asset is a data entity that is composed of one or more M-units. An MMT Asset is the data unit for which composition information and transport characteristics are defined.

MMT Package

An MMT Package is composed of one or more MMT Assets along with additional information such as composition information and transport characteristics.

Note: MMT Assets within the MMT Package can be multiplexed or concatenated.

MMT Payload Format

A generic payload format for carrying MMT Assets and other information for their consumption by MMT application protocols or other existing application transport protocols (e.g., RTP)

Note: MMT Payload may contain fragments of MFU with other information such as AL-FEC.

MMT Transport Packet

An MMT Transport Packet is a data format used by an application transport protocol for MMT.

Configuration Information

An MMT Package has functionality and operations to utilize configuration information. Configuration information includes a list of MMT Assets, Composition Information (CI) and transport characteristics.

Description Information describes MMT Package and MMT Assets. CI helps consumption of MMT Assets. Transport Characteristics Information provides hint for delivery of MMT Assets.

Flexible Ordering and Addressing of Data in the MMT Package

Data in the MMT Package can be arranged in any orders such as consumption order or priority order. The MMT Package provides information on physical location of data in the MMT Package.

Package Identification Information

Package Identification Information contains machine-readable information such as service provider ID, content ID, genre and episode number of the MMT Package. It uniquely distinguishes one MMT Package from others.

Package Identification Information also contains human-readable information such as title of service, name of actors/actresses, synopsis, etc. These information help users to choose a MMT Package to consume.

Asset List Information

Asset list Information provides a list of MMT Assets in a MMT Package. Data in the MMT Package payload is an MMT Asset and should be listed in the Asset list.

Composition Information (CI)

Composition Information specifies how MMT Assets are consumed by signaling Asset relationships. There are three major types of relationships describing composition of MMT Assets: Temporal Relationship, Spatial Relationship, and Inter-Asset Relationship.

Temporal Relationship

Temporal Relationship is a relationship between the MMT Asset timeline and the MMT Package timeline. A whole or a part of the running time of the MMT Asset is placed on some time point or duration of MMT Package timeline.

Spatial Relationship

Spatial Relationship is a relationship between the MMT Asset and a presentation area of the MMT Package. The presentation location of the MMT Asset could be changed by event (e.g., selection of chapter thumbnail) and the chosen MMT Asset may be presented in a different way (e.g., full screen) by triggering of the event.

Inter-Asset Relationship

Multiple MMT Assets may have various relationships between them. Making one or multiple choices from multiple MMT Assets requires additional information describing relationships among them. Three relationships are identified and listed here: Combinable, Mutually exclusive and Dependency Relationship. Choosing an MMT Asset with no relationship is solely done by the user's decision or client implementation.

Combinable Relationship

Combinable Relationship is a relationship that result from more than one choice from multiple choices. MMT Assets in a Combinable Relationship may have different context and different media type.

Mutually Exclusive Relationship

Mutually Exclusive Relationship is a relationship that results from one and only one choice from multiple choices. MMT Assets in Combinable Relationship typically have different context but same media type.

Dependency Relationship

Dependency Relationship is a relationship in that choosing an MMT Asset requires additional MMT Assets. An MMT Asset may have Dependency Relationship with other MMT Assets that are not in Mutually Exclusive Relationship.

Adaptive Relationship

Adaptive Relationship is a relationship between multiple MMT Assets or M-Units with the same context and the same media type. Switching from one to another in Adaptive Relationship results in perceptually equivalent context.

For example, high quality Video and mid-quality Video are in alternative relationship. The client device will choose one of the MMT Assets in an Adaptive relationship to present the same context adaptively according to network bandwidth or device capabilities.

Rights Management Information

Another Composition Information is Rights Management Information. Rights Management Information specifies whether an MMT Asset requires any rights management is considered or not. Signaling of specific rights management algorithm and its associated information is described as MMT Asset attributes in the composition information.

Transport Characteristics Information

Transport Characteristics Information provides requirements for delivery of MMT Assets. An MMT Asset shall have one set of Transport Characteristics Information. An MMT Package doesn't have delivery condition for its internal resources or MMT Assets. An MMT Asset in a MMT Package has a Transport Characteristics Information set that help to decide delivery condition for each service provider.

Error Resiliency Information

Transport Characteristics Information may include Error Resiliency Information. Simple Transport Characteristics Information for an MMT Asset could be lossless or lossy. Additionally, techniques to achieve lossless delivery such as retransmission, ARQ or Application Layer-Forward Error Correction (AL-FEC) may be specified in Transport Characteristics Information. However, the use of specific algorithm for such lossless delivery is not described by the MMT Package, and a service provider may choose to signal specific algorithms via MMT C layer packets.

Exemplary embodiments of the present invention propose information that should be contained in an MMT package, and proposes how the information should be structurally contained. Further, the present invention proposes how a transmission device and a reception device can broadcast, receive and play content using the contained information.

Figure 2:
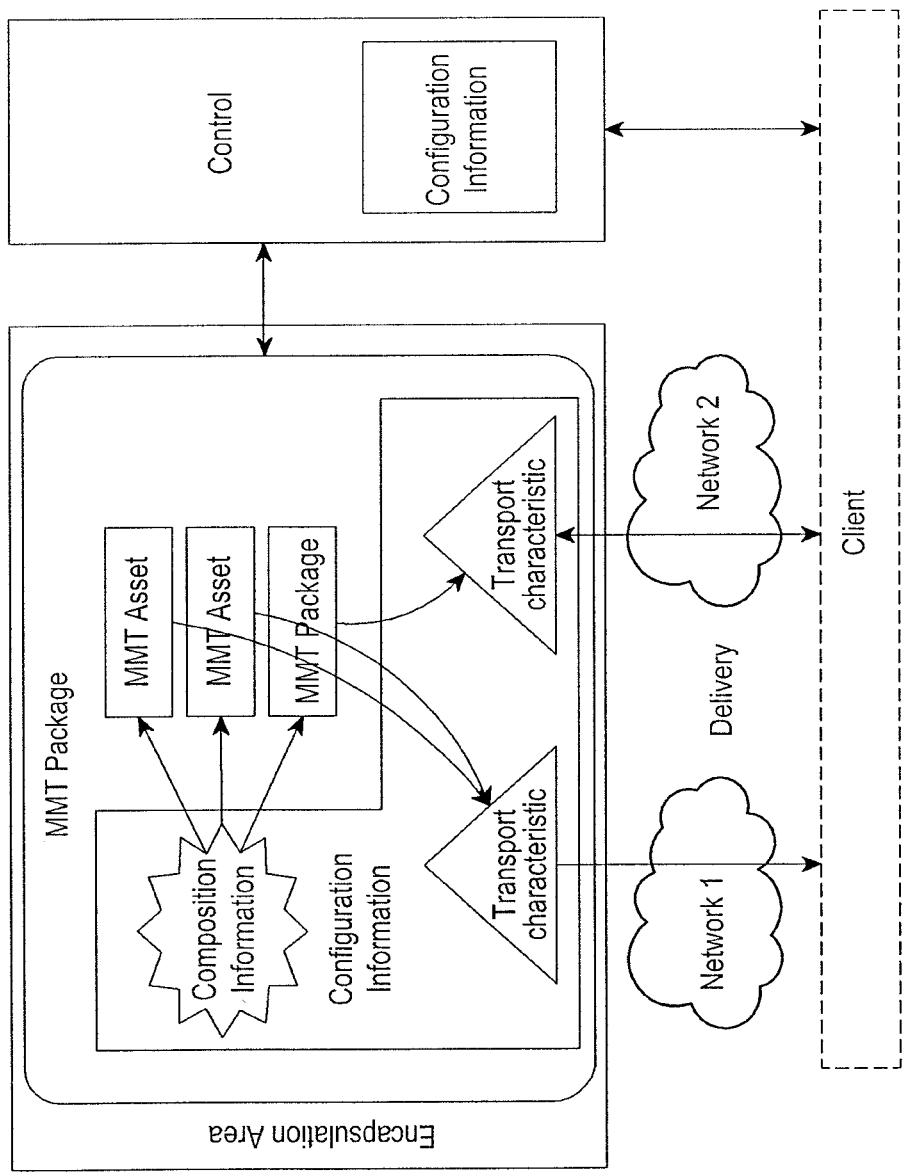
FIG. 2 shows an architecture of an MMT system for package transmission according to an exemplary embodiment of the present invention.

FIG. 1 shows a structure of an MMT package according to an exemplary embodiment of the present invention, and FIG. 2 shows an architecture of an MMT system for package transmission according to an exemplary embodiment of the present invention.

Referring to FIGS. 1 and 2, MMT content is stored in the form of an MMT package. An MPEG-2 program is defined as a package in the MMT Working Draft (WD) standard.

An MMT package (or package) includes MMT Assets, Composition Information (CI), Transport Characteristics, and other additional information. An MMT package configured as shown in FIGS. 1 and 2 is delivered to a control layer, and the control layer periodically transmits composition information to a receiver. The control layer transmits the composition information over a broadcast network or a broadband network.

Based on the configuration information and composition information received from a transmitter, the receiver determines to receive an asset suitable for its environment and receives the asset along a transmission path.

A package may be stored in the form of an ISO/IEC 14496-12 ISO based Media File Format (ISOFF). The terms to be used herein, such as Track, Box, and Sample, are the terms used in the standard ISO/IEC 14496-12 ISO based Media File Format, 3rd Edition, July 2008.

A package is one playback unit containing multimedia content. Information and data needed to play a package is contained in the package. A package may include other packages. The other packages included in the package may exist in the package, or may be indicated by a link in the outside.

In order for a package to be transmitted, information for playback of the package in a transmission and playback device should be periodically read and transmitted by a service provision server. For example, as for CI, one CI describing the entire package may be periodically retransmitted, considering TV that is turned on during broadcast. A CI that is configured to be updated in every some time period of the entire package may be periodically retransmitted in its associated time period and then updated in the next time period. In this way, depending on the structure of a CI, the CI may be inserted in a header of a package, or may be inserted in a payload of a package so that the CI may be added as the package is generated. Further, depending on Transport Characteristics (TC) of assets in a package, predetermined parts of assets may need to be transmitted to unspecified users using a broadcast protocol at a predetermined time, and some assets may need to be transmitted over a broadband network upon user's request. Information that indicates a certain part of a certain asset, which needs to be transmitted at a certain playback time depending on a playback timeline of a package, should be newly considered along with Composition Information of the package, which is considered in Working Draft (WD).

Exemplary embodiments of the present invention proposes to store components of a package in the form of ISOFF, or in a folder or a ZIP file, and to store the existing information, which was not defined in the file standard, in a new box identifier and box structure. Components of a package are as follows:

MMT Asset (Component 1 of Package)

In the MMT standard, a term 'asset' is used that has a similar concept as a stream. An MMT asset contains one multimedia component that can be played and represented (or rendered), such as, for example, videos, audios, fonts, subtitles, and widgets.

It will be assumed herein that an MMT asset has information sufficient to perform a related function, for this purpose.

In order to be inserted in the form of ISOFF, an asset according to an exemplary embodiment of the present invention maps the concept and unit of ISOFF to the concept and unit in MMT as follows:

- An MMT asset corresponds to a track of ISOFF.
- An MMT asset corresponds to a sample of ISOFF by binding Media Fragment Units (MFUs) constituting one Access Unit (AU), i.e., a unit to which a time may be granted.
- An MU of an asset corresponds to a chunk or a run of ISOFF.
- The time of AU corresponds to a time of a sample.
- An offset of MU corresponds to an offset of a chunk including a sample.

Configuration Information (Component 2 of Package)

Figure 3:
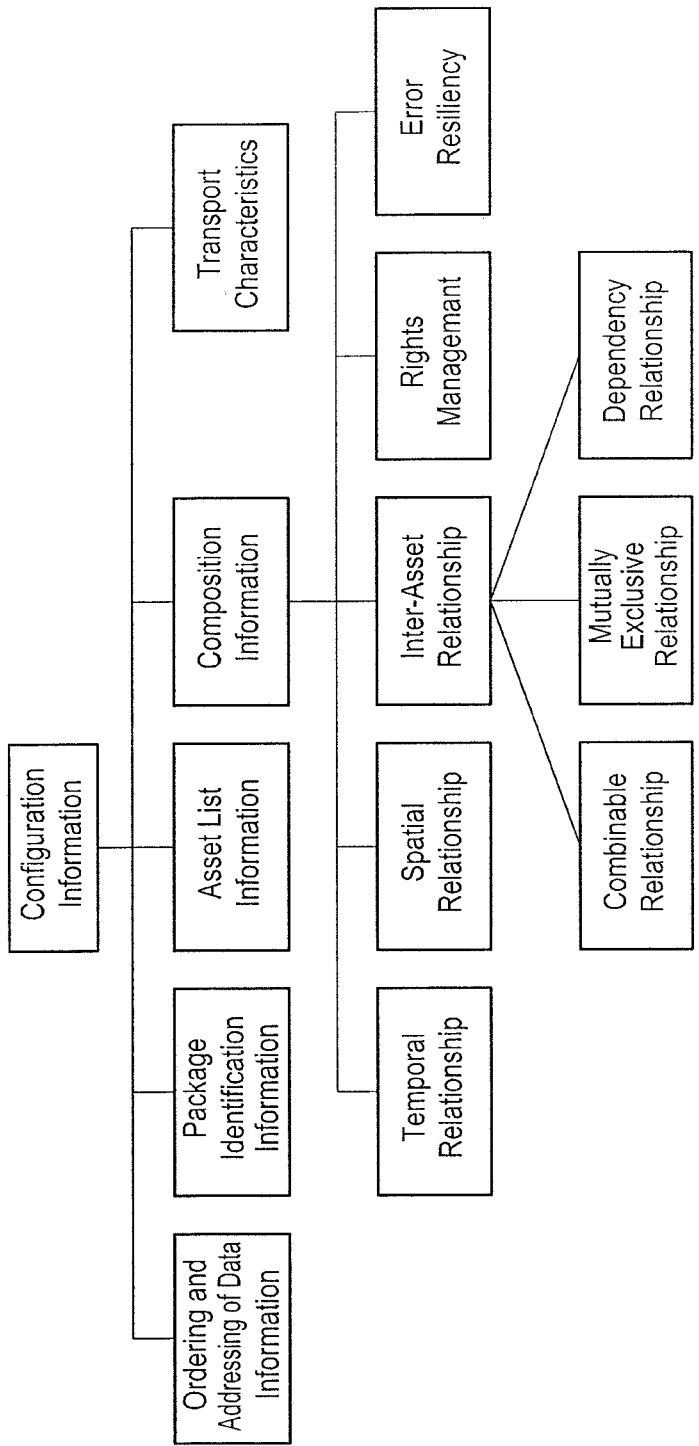
FIG. 3 shows Configuration Information and its sub-information according to an exemplary embodiment of the present invention.

FIG. 3 shows Configuration Information and its sub-information according to an exemplary embodiment of the present invention.

Referring to FIG. 3, Configuration Information includes identification information of a package, a list of assets which are components of a package, CI, Transport Characteristics, and additional information along with content, and provides structural information indicating how and where these components are included in a package.

According to an exemplary embodiment of the present invention, each of the information is individually stored as an object in the form of XML or Box as shown in FIG. 3, and its detailed syntax will be described again below.

Configuration Information and its sub-information are represented in the form of Box as follows. These boxes may be placed as sub-boxes of an appropriate box in accordance with the ISOFF structure:

```
aligned(8) class ConfigurationInformationBox
extends FullBox('cfgi', version, flags){
    PackageIdentificationInformationBox pi;
    AssetListBox al;
    CompositionInformationBox ci;
    TransportCharacteristicsBox tc;
    RightsManagementInformationBox rm;
}
```

Composition Information (Component 3 of Package)

Figure 4:
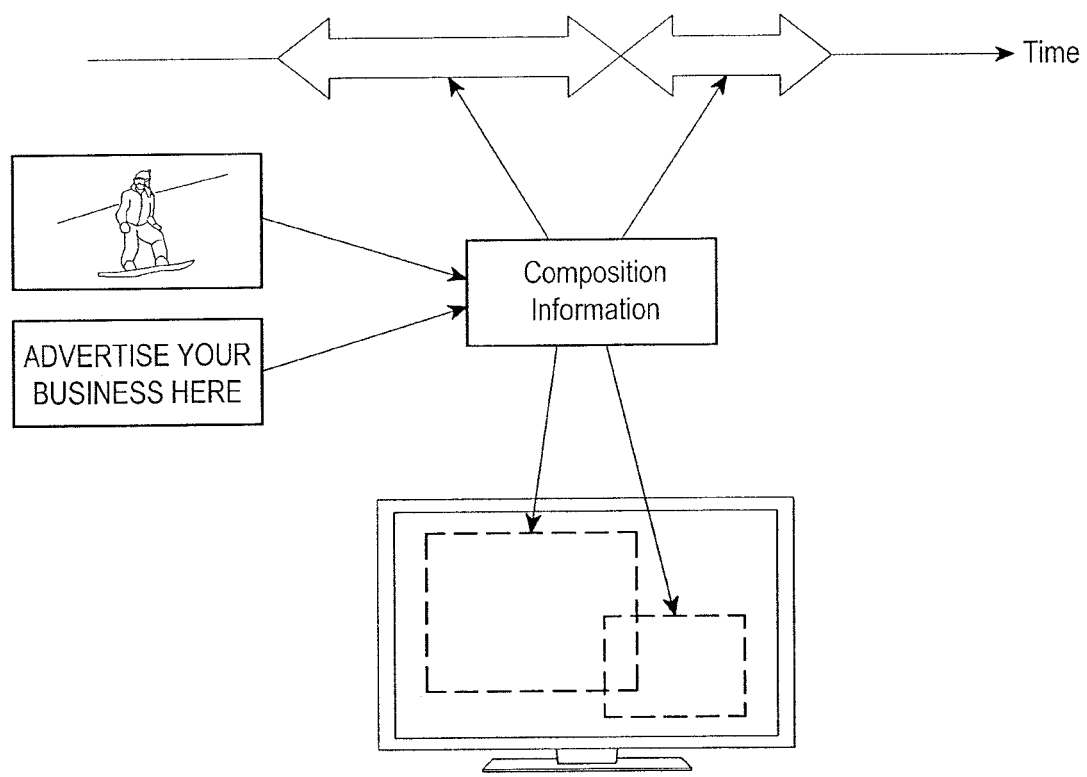
FIG. 4 shows a temporal/spatial arrangement of assets according to an exemplary embodiment of the present invention.

FIG. 4 shows a temporal/spatial arrangement of assets according to an exemplary embodiment of the present invention.

Referring to FIG. 4, Composition Information has temporal composition information indicating a representation start time and a representation end time of an MMT asset.

Further, Composition Information has spatial composition information indicating where on a screen an MMT asset is represented.

Therefore, although it is not possible to determine when and where to represent MMT assets with only the MMT assets, it is possible to determine the author's intent based on Composition Information and then represent the MMT assets in the proper position at the proper time.

It will be assumed herein that Composition Information has information sufficient to perform a related function, for this purpose.

The CI may have the following structure:

```
aligned(8) class CompositionInformationBox
extends FullBox('cmpi', version, flags) {
    unsigned int(8)[ ] composition_information_URL;
    unsigned int(32) composition_information_Id;
    if(composition_information_Id == 0)
    {
    string ci_schema;
    string xml_data;
    }
}
```

Figure 5:
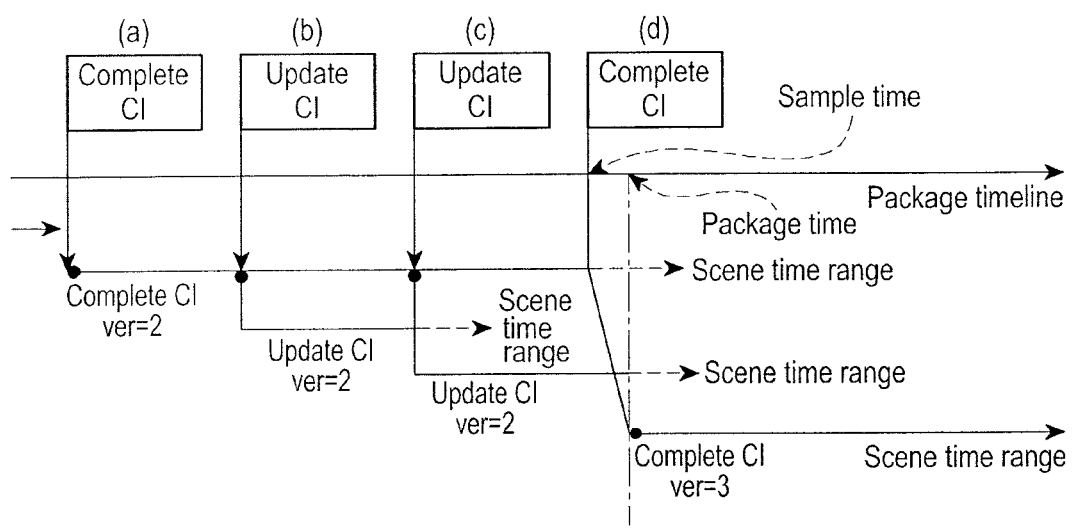
FIG. 5 shows how a Composition Information (CI) sample is changed or replaced, which is received from a CI track over time of a package according to an exemplary embodiment of the present invention.

According to exemplary embodiments of the present invention, CI may be composed of one CI describing the entire package, or as shown in FIG. 5, CI describing some time period of a timeline of the entire package may exists separately, so that the CI is configured to be updated as another CI in the next time period.

FIG. 5 shows how a CI sample is changed or replaced, which is received from a CI track over time of a package according to an exemplary embodiment of the present invention.

Referring to FIG. 5, if a Complete CI (a) of a new version is transmitted, the scene is replaced by the pertinent version. Thereafter, if an Updated CI (b) is transmitted, the existing complete CI version 2 (a) indicated by Update CI is changed. Similarly, the succeeding Updated CI (c) also indicates a change in Complete CI (a). If a Complete CI (d) of a new version is transmitted, both the Complete CI of an old version and its update are deleted, and a package is represented using a new CI. More specifically, CI has two different times: time on a package being represented based on the contents of the CI, and time of a sample having the CI. The time of a sample is used to prepare resources indicated by received CI, and the time of CI indicates the time the representation of the prepared resources needs to be started.

Accordingly, a method is proposed that inserts CI in a header of a package or provides the CI as a track in a payload of the package so that some or all of the contents may be updated in each time period. In the case of the track, one complete CI is inserted in one sample, and partial CI for update is also inserted in one sample. In order to distinguish a complete CI from partial CI for update, types of samples are distinguished by providing separate metadata. The metadata may be provided in a header of a movie fragment at the same frequency when handler_type of the track is 'mtci'.

The metadata for representing the type of a CI sample may be provided as follows:

```
aligned(8) class CISampleInformationBox
extends FullBox('cisi', version, flags){
    int i;
    unsigned int(32) number_of_sample;
    for(i=1;i<=number_of_sample;i++){
    unsigned int(2) ci_type; //0=unknown, 1=complete, 2=update
    unsigned int(6) reserved;
    unsigned int(8) ci_version;    //version information
    if(ci_type==2){
    unsigned int(8) complete_ci_version;
    }
    }
}
``` number_of_sample describes how many samples are in the fragment.

ci_type is used to determine whether the CI mapped to a sample is a complete CI or a CI for update.

ci_version indicates that when a complete CI is newly provided, it is changed from the previous complete CI.

complete_ci_version indicates to which complete CI the CI for update corresponds, if ci_type is update.

Transport Characteristics (Component 4 of Package)

Transport Characteristics indicates the characteristics that should be considered during transmission of an MMT asset. Even though some data of, for example, video is lost causing degradation of its image quality, there is no great difficulty for the user in enjoying the entire contents. In this case, the loss may be allowed in a comprehensive sense. In a case where the loss is allowed, if an error occurs during transmission, additional data for recovering the error may be provided. If the error is not recovered despite the use of the additional data, the damaged content is allowed to be played at the risk of the loss.

However, if some data of, for example, a program is lost, execution of its entire program is impossible. In this case, the loss is not allowed in a comprehensive sense. If an error occurs during transmission, additional data is used to recover the error, and if the error is not recovered despite of the use of the additional data, retransmission needs to be requested. Otherwise, data of the program is unavailable.

It will be assumed herein that Transport Characteristics has information sufficient to perform a related function, for this purpose.

For Transport Characteristics, a structure is proposed in which the Transport Characteristics is provided in the form of a list and combined with assets. Combination information is contained in Asset list information. It is stored in the form of XML, or in the form of Box of ISOFF.

The structure of the Transport Characteristics may be as follows:

```
aligned(8) class TransportCharacteristicsBox
extends FullBox('tchr', version, flags){
    int i;
    unsigned int(8) number_of_tc;
    for(i=1;i<=number_of_tc;i++){
        //Transport Characteristics here
    }
}
``` number_of_tc indicates the number of TCs described in the box.

Package Identification Information (Component 5 of Package)

In order for a package to be distinguished from other packages, an identifier is needed, which can be identified by a person. Further, information describing the contents of package is also needed, such as an ID of a provider, a genre, and an episode number. The identifier and information may be included in Package Identification Information. The Package Identification Information is stored in the form of XML, or in the form of Box of ISOFF.

According to an exemplary embodiment of the present invention, the following information is proposed as information that needs to be inserted in Package Identification Information:

```
PackageIdentificationInformationBox( ){
    unsigned int(2) package_type;
    unsigned int(4) version;
    unsigned int(2) time_base;
    if(time_base == 0)
    {
        unsigned int(40) start_time;
    }
    if(flags & 1){
        MediaAnnotation( ){
            string annotation_schema;
            string xml_data;
        }
    }
    MachineReadableIdentifier( ){
        PackageType;
        Version;
        PackageCreatorIdentifier;
        PackageIdentifier;
        SeriesNumber;
        EpisodeNumber;
    }
    HumanReadableIdentifier( ){
        NameOfPacakge;
        Synopsis;
        Actors( ){
            NameOfActors[ ];
        }
        Characters( ){
            NameOfCharacters[ ];
        }
    }
}
``` package_type indicates whether the package has a type of one completed file, or has a variable structure whose length is unfixed.

time_base indicates on which time the time of the package is based. For example, if 'time_base' is 0, the package is played at a certain time on a certain date, which is based on real time. If 'time_base' is 1, the package is played at a relative time where the time at which each playback device starts playback is set to 0.

annotation_schema indicates a type of the format in which XML data for representing the contents of the package is described.

xml_data indicates contents of the package, which are described in accordance with the format defined in annotation_schema.

Machine readable identifier: used to distinguish a package from other packages. The machine readable identifier includes an identifier of a creator, an identifier of content, and an identifier of an episode of the content.

human readable identifier: when a package is provided, provides information to make it possible to select the package. The human readable identifier includes a variety of additional information such as a name of a package, a plot, characters, and actors' names.

package type (OnDemand/Live): indicates whether the package is a package containing already created content such as movies, or is real-time broadcast. While the former has a timeline relative to a playback start time, the latter has a timeline relative to the current time.

version: may be used to select a package that should be used in the version, when there are different packages having the same identifier.

Asset List Information (Component 6 of Package)

Asset list Information provides information indicating which asset is contained inside or outside a package. Asset list Information is proposed to be composed of the following information:

```
aligned(8) class AssetListBox
extends FullBox('alst', version, flags){
int i;
unsigned int(32) number_of_asset;
for(i=1;i<=number_of_asset;i++){
string asset_url;
unsigned int(32) track_id;
string MIME_type;
unsigned int(32)[ ] tc_id;
unsigned int(32)[ ] fallback_asset_Id[ ];      //1,2,3,..
unsigned int(32)[ ] rights_management id;
}
}
``` number_of_asset: indicates the total number of assets described in the Box. All assets inside or outside a package, which are indicated by Composition Information, should be included in this list. Accordingly, a package playback device may determine in advance the information about all the necessary assets from the Asset List Box.

asset_url: indicates an asset outside the package, if there is a Uniform Resource Locator (URL). An asset in another package, or another package itself may be used as the asset. If an asset exists only inside a package, a URL value is NULL.

track_id: indicates in which track of the package an asset is included.

Multi-purpose Internet Mail Extensions (MIME)-type: by representing MIME-type of an asset, it is possible to know in advance whether a format of the asset is a playable format.

Fallback_asset_id: indicates IDs of a plurality of other assets which may be played when a specific asset cannot be played. When there are a plurality of other assets, their preferred priorities of a package provider comply with lexical order.

tc_ID: indicates Transport Characteristics of a specific asset, and indicates IDs of a plurality of Transport Characteristics.

rm_ID: indicates IDs of a plurality of rights management information for decryption, when a specific asset is protected by being encrypted. Asset list Information is stored in the form of XML, or in the form of Box of ISOFF.

Rights Management Information (Component 7 of Package)

If a package includes protected content, some or all assets may be encrypted by Digital Rights Management (DRM) or Conditional Access System (CAS). A structure is proposed in which information, such as a type of an encryption method, a key information server, and a license information server, is provided in the form of a list, and combined with an asset. Combination information is contained in Asset list information. Rights Management Information is stored in the form of XML, or in the form of Box of ISOFF, and is composed of the following information:

```
aligned(8) class RightsManagementInformationBox
extends FullBox('rmgi', version, flags){
int i;
unsigned int(8) number_of_rmi;
for(i=1;i<=number_of_rmi;i++){
string rmi_scheme;
string IV;
string key_server_url;
string license__server_url;
string rmi_data; //rmi here
}
}
``` number_of_rmi: indicates the number of all Rights Managements described in the Box.

rmi_scheme: indicates a type of an encryption method.

IV: indicates a value of Initial vector.

Key_server_url: indicates an address of a key information server.

License_server_url: indicates an address of a license server.

rmi_data: indicates additional information this is needed depending on rmi_scheme.

Transport Timeline Information (Component 8 of Package)

A package is composed of assets. Some assets are displayed for a user by being transmitted at an appropriate time on a playback timeline of a package. Information about the parts of an asset, which are needed for normal playback, is provided as Transport Timeline Information.

Figure 6:
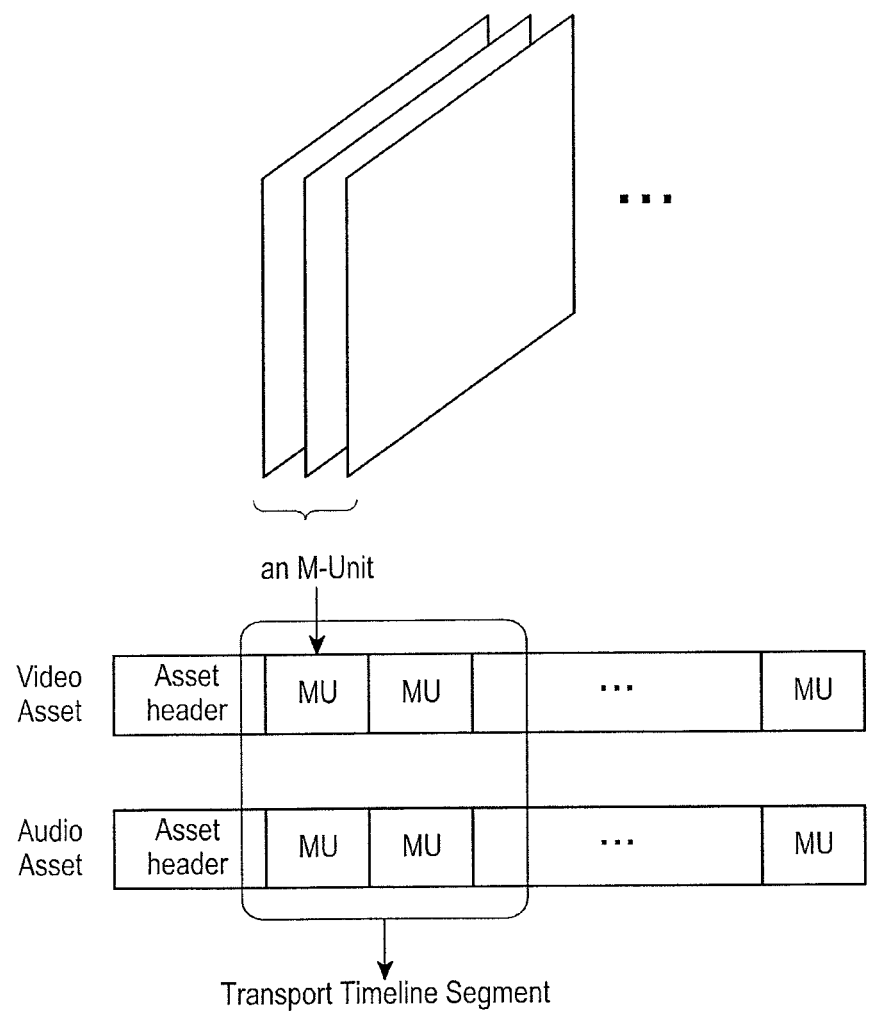
FIG. 6 shows a transport timeline segment according to an exemplary embodiment of the present invention.

FIG. 6 shows a Transport Timeline segment according to an exemplary embodiment of the present invention.

Referring to FIG. 6, since an asset is composed of MUs and an MU is composed of samples, the asset provides sample number information for MUs of different assets of different tracks, which are needed for playback of MUs in assets.

A playback time of a package is called a timeline. The timeline is divided into segments which are certain time periods, to represent its start time and length. For each segment, an id of an asset, which should be transmitted, and a certain part of the asset, which needs to be transmitted, are represented by MU numbers.

Transport Timeline Information is stored in the form of XML, or in the form of Box of ISOFF.

The Transport Timeline Information may have the following structure:

```
TransportTimelineInformationBox( ){
number_of_timelineSegment;
for(i=1;i<=number_of_timelineSegment;i++){
timelineSegment( ){
starttime;
duration;
number_of_assets;
for(j=1;j<=number_of_assets;j++){
asset_id;
start_MU_number;
end_MU_number;
}
}
}
}
```

1) Box('ftyp')

A 'ftyp' box of ISOFF indicates which ISOFF extension format or version the file uses. All compatible versions may be written, and an MMT package will use an identifier called 'MMT Package (mtpk)'.

2) Box('hdlr')

A 'hdlr' box of ISOFF indicates which process should handle media data or metadata. Composition Information will use an identifier called 'MMT Composition Information (mtci)'. MMT Asset will use an identifier called 'MMT Asset (mtas)'.

3) Box('trak')

Composition Information is stored as one sample, because one sample has one time value when Composition Information is written in a track. An asset is written in a track, and for a first sample in each track, Asset Header is stored. For its succeeding samples, one MU is stored as one sample. If a package includes sub-packages, the included packages are written in a track. The entire package is stored without a change in format, and one package is stored as one sample.

A method of storing a package according to an exemplary embodiment of the present invention is as follows:

1. Structure of ISOFF

Figure 7:
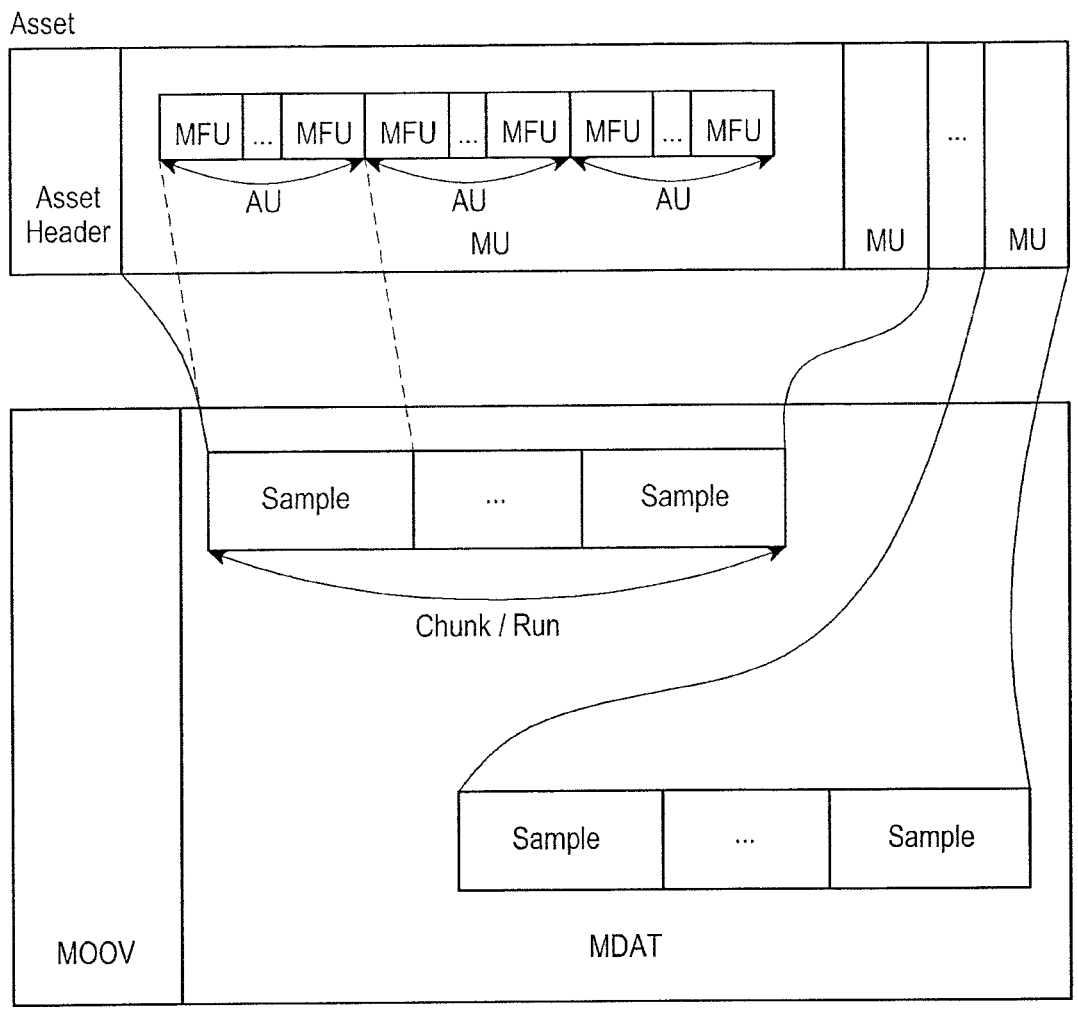
FIG. 7 shows a structure in which an asset and an ISO-based media File Format (ISOFF) are mapped according to an exemplary embodiment of the present invention.
Figure 8:
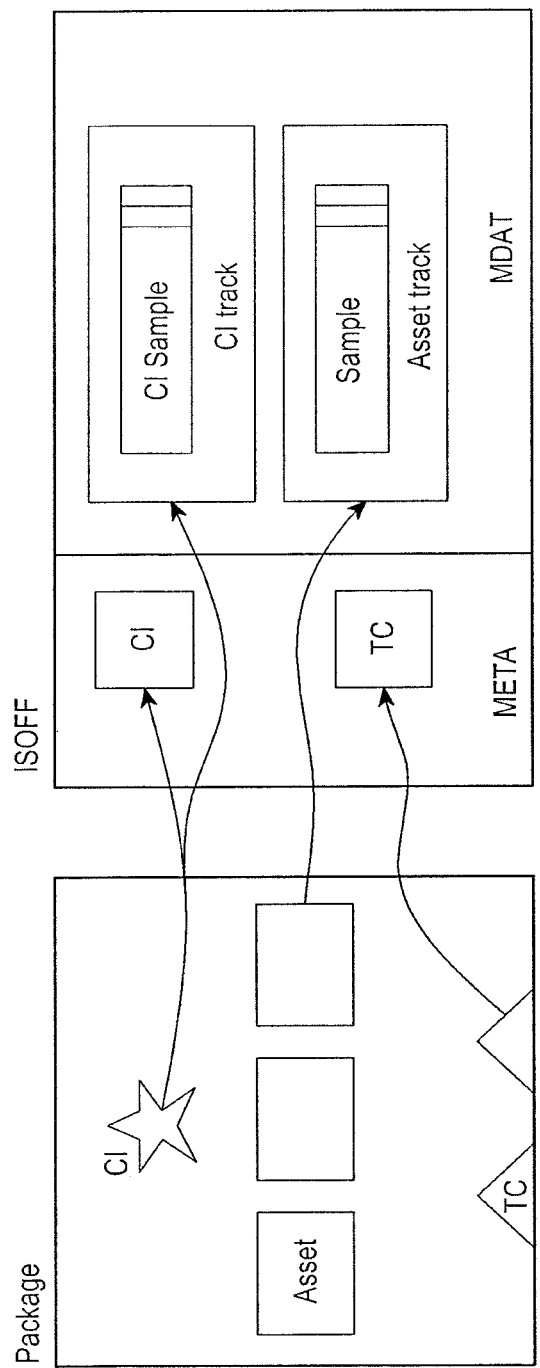
FIG. 8 shows a structure in which a package and ISOFF are mapped according to an exemplary embodiment of the present invention.

An example of a structure is illustrated in FIGS. 7 and 8, in which a package is mapped to one file by including the above-described components of a package in the ISOFF structure.

FIG. 7 shows a structure in which an asset and ISOFF are mapped according to an exemplary embodiment of the present invention, and FIG. 8 shows a structure in which a package and ISOFF are mapped according to an exemplary embodiment of the present invention.

Referring to FIGS. 7 and 8, MFUs and MUs are mapped to samples in a track in an asset.

An asset is composed of a succession of MUs, and an MU is composed of one or more Access Units (AUs). An Access Unit is a bundle of media pieces having a unique time. An AU is composed of one or more MFUs. Since an asset has media components, the asset may be mapped to a track which is a unit for storing media components in ISOFF. Since chunks (static ISOFF) or runs (dynamic ISOFF) of a track, which are logically contiguous but physically different, are stored in a mixed way the chunks or runs may be mapped to one or multiple MUs. Since a chunk is composed of samples having a unique time, it is preferable to bind MFUs into AUs and map them to samples of ISOFF.

Since a package is composed of configuration information such as Composition Information and Transport Characteristics, and an asset(s), the package should be included in an appropriate box among a descriptor box ('moov' or 'meta') and a media data box ('mdat') of ISOFF In the case of a static package, CI may be included in a 'Meta' box which is a descriptor box, since one CI is not changed till a playback complete time of a package. In the case of a dynamic package the CI may be included in a CI sample in a CI track since several CIs may be transmitted. Transport Characteristics may be included in a 'Meta' box which is a descriptor box, since the Transport Characteristics has the same value from the beginning to the end, for one asset. An asset is included in a track as described.

Figure 9:
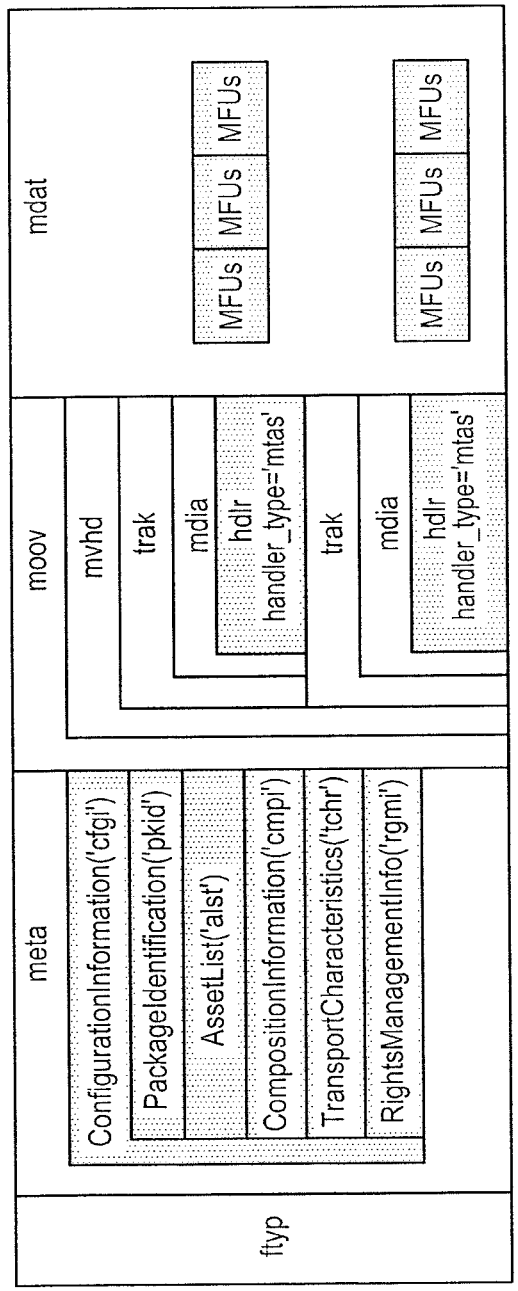
FIG. 9 shows an ISOFF structure in which a static package is stored, according to an exemplary embodiment of the present invention.

FIG. 9 shows an ISOFF structure in which a static package is stored, according to an exemplary embodiment of the present invention.

Referring to FIG. 9, metadata includes Package Identification Information and Configuration Information, and the Configuration Information includes Composition Information, Transport Characteristics, Asset list Information, Rights Management Information, and Transport Timeline Information.

Media data 'mdat' includes Composition Information, information indicating what is updated, and a new CI, and includes a plurality of asset headers and a plurality of MUs.

Figure 10:
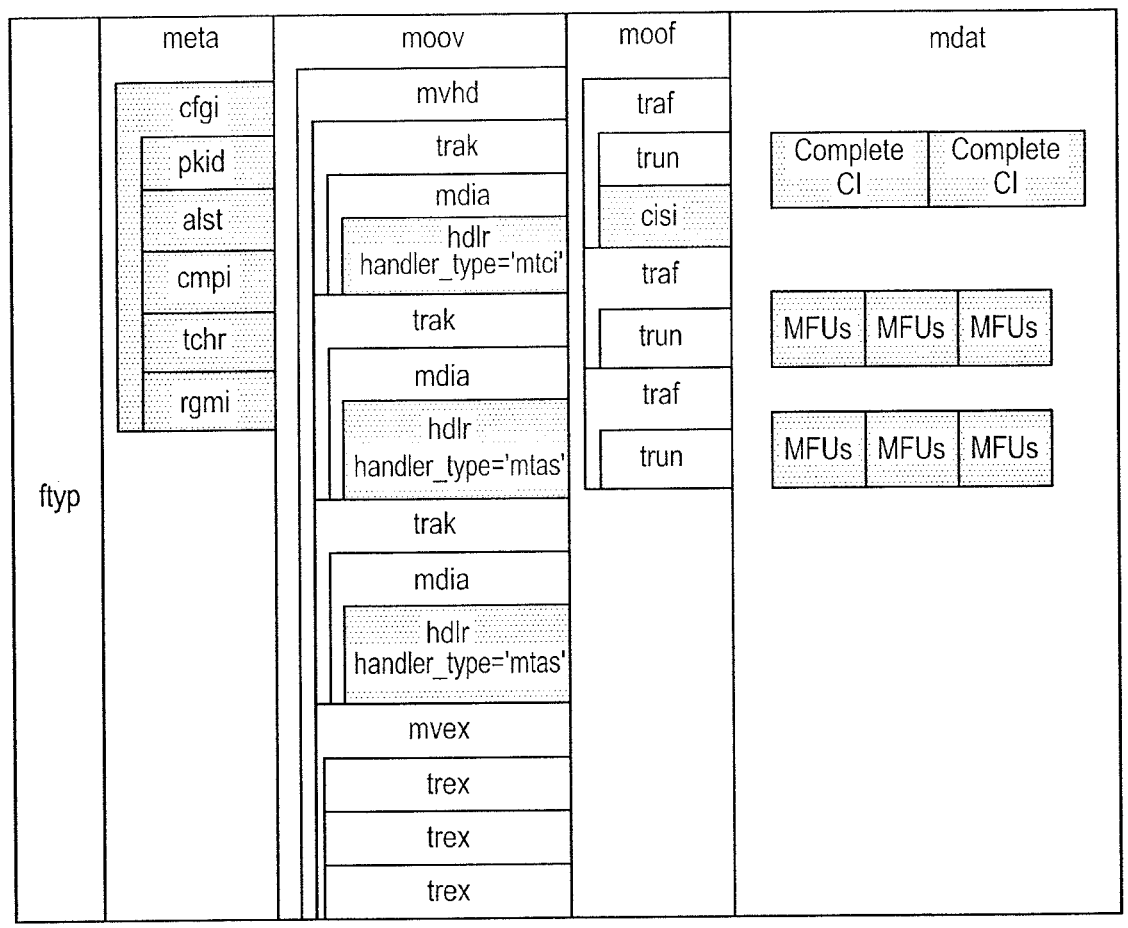
FIG. 10 shows an ISOFF structure in which a dynamic package is stored, according to an exemplary embodiment of the present invention.

As shown in FIGS. 9 and 10, a package is stored as one file, so it can be easily stored, and a package may be easily distributed by being inserted or stored in an optical disc or a removable disk.

For a static package, since its package length is determined or fixed, Composition Information (CI) that should be represented for a package playback time, and all assets indicated by the CI are created, so CI is included in a 'cmpi' box of a 'meta' box which is a descriptor box, and a media descriptor and media data are included in 'moov' and 'mdat' boxes, which are other descriptor boxes.

FIG. 10 shows an ISOFF structure in which a dynamic package is stored, according to an exemplary embodiment of the present invention.

Referring to FIG. 10, for a dynamic package, since its package length is undetermined or unfixed and CI can be dynamically changed, the CI is not included in a 'meta' box and is included in an 'mdat' box of a movie fragment along with an asset, so it can be transmitted whenever its change is needed. A 'cmpi' box of Meta provides an identifier of a CI track which is a track on which CI is to be transmitted, and a 'moof' box, which is a 'Movie fragment' descriptor of a CI track, provides a 'cisi' box for indicating whether a CI sample of a CI track is a Complete CI or a Update CI (e.g., change of the existing CI).

2. Use of Plurality of Files

Figure 11:
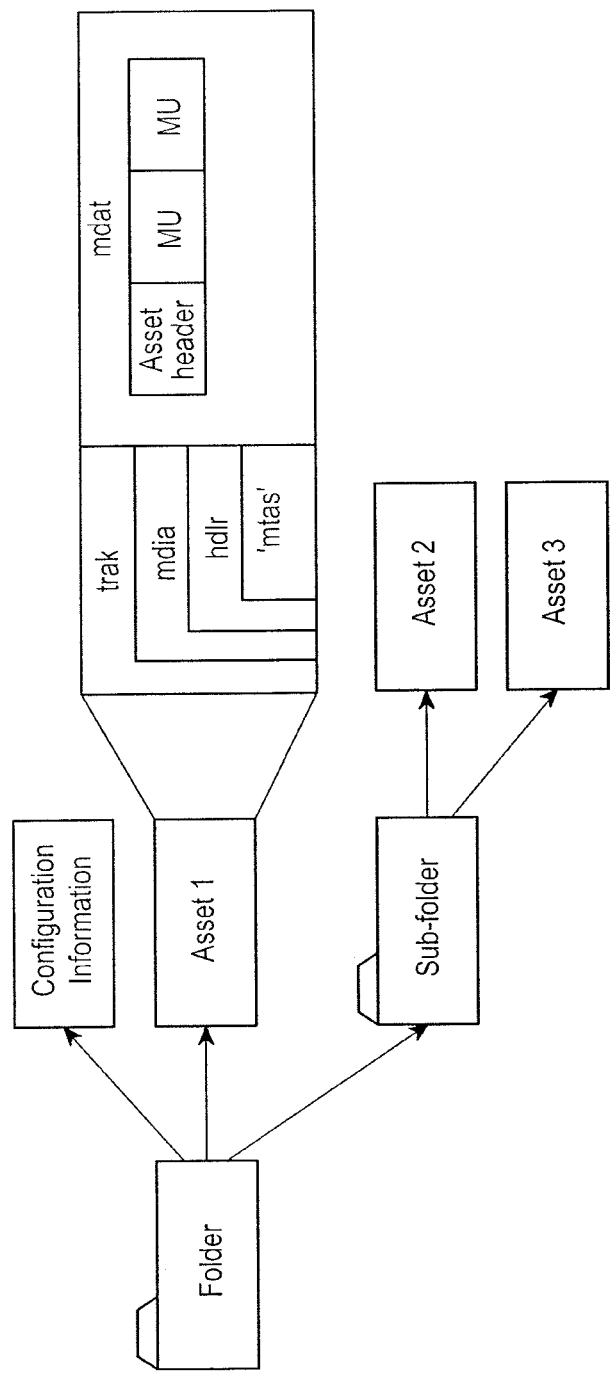
FIG. 11 shows a structure of a folder in which a plurality of files are stored, according to an exemplary embodiment of the present invention.
Figure 12:
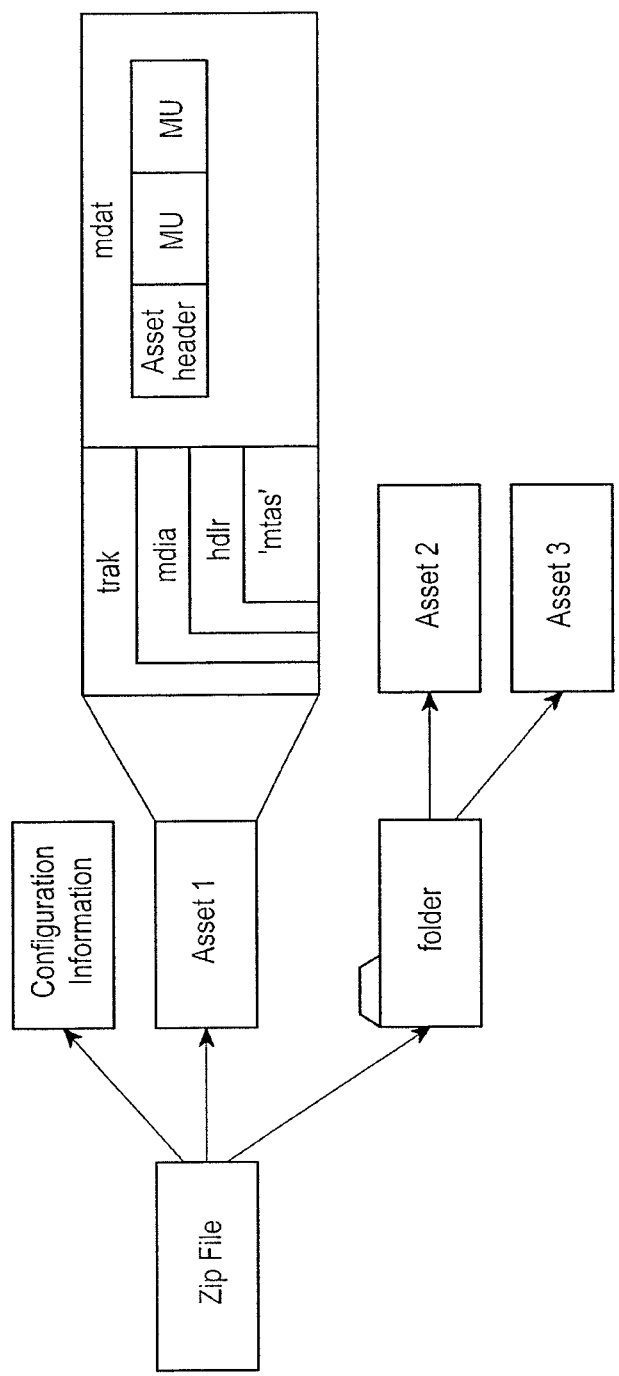
FIG. 12 shows a structure of a compressed file such as a ZIP file, in which a plurality of files are stored, according to an exemplary embodiment of the present invention.

FIG. 11 shows a structure of a folder in which a plurality of files are stored according to an exemplary embodiment of the present invention, and FIG. 12 shows a structure of a compressed file such as a ZIP file, in which a plurality of files are stored according to an exemplary embodiment of the present invention.

Referring to FIGS. 11 and 12, individual files are created and provided according to role by being bound together. A CI field and asset files are created, and then stored in a component(s) of one folder as shown in FIG. 11, or provided by being bound as a compressed file such as a ZIP file, as shown in FIG. 12.

When a plurality of files are stored in a folder, an XML file having Configuration Information is stored in the folder, and one or multiple asset files are stored therein. If necessary, an asset file may be stored in a sub-folder, but Configuration Information should exist in the root of the folder where the package is placed. Configuration Information has a separate specific reserved name for its discrimination from a fast access, and other XML and access files, and a file other than Configuration Information should not use the reserved name.

During storage of a ZIP file, like during storage of files in a folder, a CI file and one or multiple asset files are stored as a ZIP file. If necessary, an asset file may be stored in a folder in the ZIP file, but Configuration Information should exist in the root of the ZIP file where the package is placed. Configuration Information has a separate specific reserved name for its discrimination from a fast access, and other XML and access files, and a file other than Configuration Information should not use the reserved name.

Considering several service scenarios in heterogeneous networks, a description will be made of how content having the package structure proposed by the present invention can be transmitted and served.

3D Broadcast Service (Scenario 1)

A 3-dimensional (3D) broadcast service over heterogeneous networks is disclosed. 3D content is transmitted over networks having two different types of physical characteristics: a broadcast network and a broadband network. Left-view images are transmitted over the broadcast network and right-view images are transmitted over the broadband network. While free users may receive only the left-view images, paid users using paid services (such as monthly subscribers) may receive the right-view images over the broadband network and enjoy the 3D service upon logging in.

A transmission scenario for the content composed of the proposed package is as follows:

A package is configured for transmission of 3D broadcast over the heterogeneous networks. The package is composed of a left-view asset, a right-view asset, composition information constituting a 3D screen, Transmission Characteristics of the broadband network, and Transmission Characteristics of the broadcast network.

The left-view asset is available over the broadcast network.

On the other hand, the right-view asset is available over the broadband network. Its URL requires user authentication during access. In the case of a premium subscriber, the subscriber may download the right-view asset after authentication. Otherwise, the right-view asset is unavailable.

In a transmission device, package information is transferred to a control layer. The control layer reads CI from the beginning and periodically transmits the CI to a receiver.

A service provider composes a package as above and transmits configuration information of the package over the broadcast network or the broadband network. The configuration information includes information about the available transmission paths for assets. The transmission path is determined depending on the Transmission Characteristics.

The receiver determines to receive an appropriate asset depending on its environment by reading configuration information of the transmitted package and receives the asset along the transmission path. The received asset is temporally and spatially arranged depending on the Composition Information, and then played and delivered to the user.

Since screen configuration includes a case where the right-view asset is unavailable, content may be created and rendered only with the left-view asset without the right-view asset.

Complex Package Content (Scenario 2)

Figure 13:
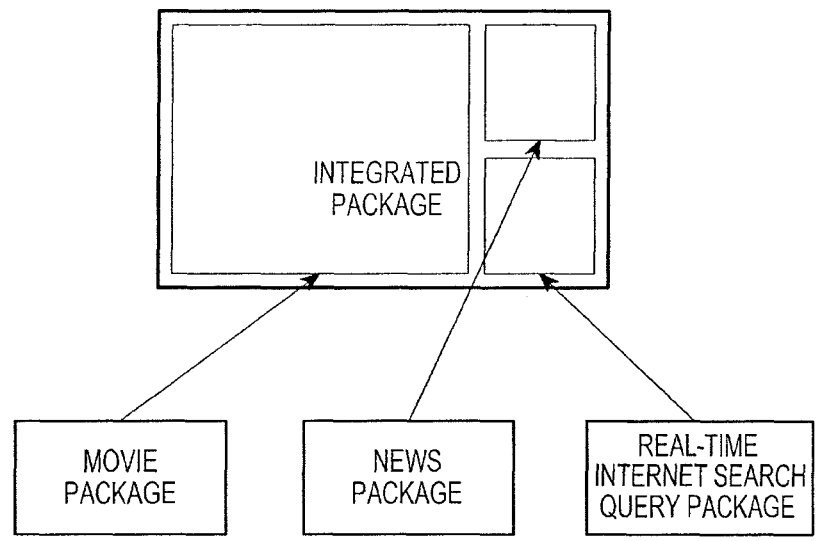
FIG. 13 shows an integrated package and its sub-packages according to an exemplary embodiment of the present invention.

FIG. 13 shows an integrated package and its sub-packages according to an exemplary embodiment of the present invention.

Referring to FIG. 13, a complex content screen is composed of a variety of different content. Various components such as movies, news, and real-time Internet search queries are arranged on one screen. Each component may be transmitted from its own unique server. Movies may be transmitted from film companies, news from news channels, and real-time Internet search queries from portal sites.

A transmission scenario for content composed of the proposed packages is as follows.

Packages constituting a main screen are created, which are from a hub site operated by the reception device manufacturer, broadcasting stations, and/or the third service aggregators. For the packages, their several components may be arranged on the screen as follows.

Since components of an integrated service, such as movies, news and real-time Internet search queries, may be reused in other integrated services, it is efficient to create the components in the form of a separate package so that they may be reused in other packages, rather than managing them as assets of one package. Accordingly, each of movies, news, and real-time Internet search queries is composed as one package, and an integrate package is configured to include these individual packages.

An integrated package 1 indicates its sub-packages 2, 3 and 4 in CI. Since the sub-packages 2, 3 and 4 exist in different servers, the integrated package 1 indicates only the links of its sub-packages 2, 3 and 4.

For the sub-package 2, its full screen is composed of movies.

For the sub-package 3, its full screen is composed of news.

For the sub-package 4, its full screen is composed of real-time Internet search queries.

In a transmission device, package information is transferred to its control layer. The control layer reads CI from the beginning and periodically transmits the CI to a receiver.

The receiver determines to receive an appropriate package depending on its environment by reading configuration information of the transmitted package and receives the package along the transmission path. The received package is temporally and spatially arranged depending on the Composition Information, and then played and delivered to the user.

Figure 14:
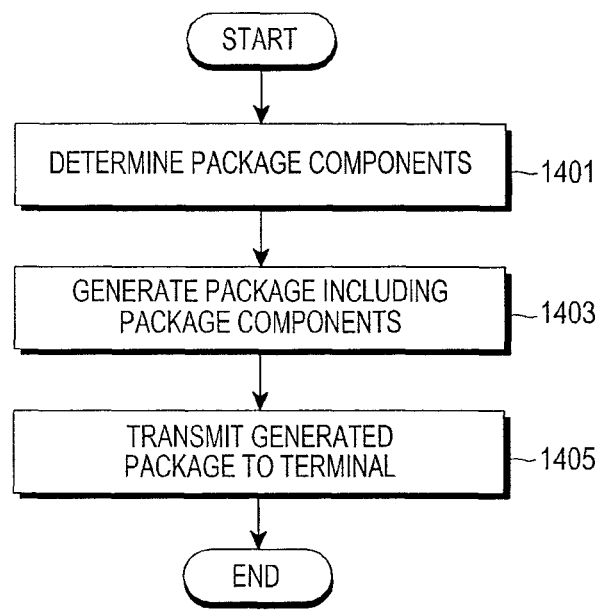
FIG. 14 shows a transmission method according to an exemplary embodiment of the present invention.

FIG. 14 shows a transmission method according to an exemplary embodiment of the present invention.

Referring to FIG. 14, a transmission device may be, for example, a service provision server, but the transmission device may not be limited to the service provision server.

In step 1401, the transmission device determines package components constituting a package described above. The transmission device generates a package including the determined package components in step 1403, and transmits the generated package to a terminal in step 1405. The package may be included in the ISOFF structure and mapped to one file. Otherwise, file components may be created in the form of a file and included in a component of one folder, or included in a compressed file such as a ZIP file.

The generated package may be transmitted to the terminal over networks having two different types of physical characteristics: a broadcast network and a broadband network. Otherwise, individual packages may be created for individual content, and an integrated package composed of the individual packages may be created and transmitted to the terminal.

Figure 15:
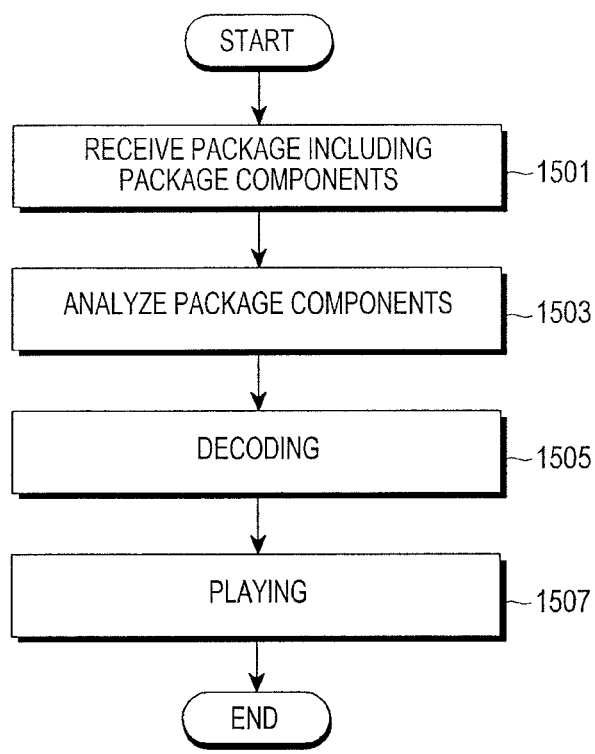
FIG. 15 shows a reception method according to an exemplary embodiment of the present invention.

FIG. 15 shows a reception method according to an exemplary embodiment of the present invention.

Referring to FIG. 15, a reception device may be, for example, a terminal, but the reception device may not be limited to the terminal.

The reception device receives a package including package components configured according to an exemplary embodiment of the present invention in step 1501, and analyzes the package components in step 1503. In steps 1505 and 1507, the reception device decodes and plays content based on the analyzed package components. It will be apparent to those of ordinary skill in the art that the received package components are package components which are configured according to an exemplary embodiment of the present invention.

Figure 16:
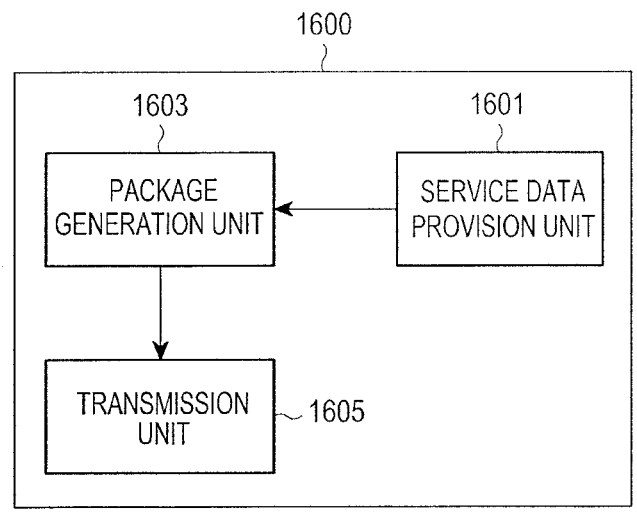
FIG. 16 shows a structure of a transmission device according to an exemplary embodiment of the present invention.

FIG. 16 shows a structure of a transmission device according to an exemplary embodiment of the present invention.

Referring to FIG. 16, the transmission apparatus 1600, for example, a service provision server, includes a service data provision unit 1601, a package generation unit 1603, and a transmission unit 1605. Although not shown in the drawing, it will be apparent to those of ordinary skill in the art that to perform an operation of the present invention, the transmission device has a controller capable of controlling its components.

The service data provision unit 1601 has all possible service services.

The package generation unit 1603 determines package components constituting a package described above, and generates a package including the determined package components.

The transmission unit 1605 transmits the generated package to a terminal. The package generator 1603 may include the package in the ISOFF structure and map it to one file. Otherwise, the package generator 1603 may create file components in the form of a file and include the file components in a component of one folder, or include the file components in a compressed file such as a ZIP file.

The transmission unit 1605 may transmit the generated package to the terminal over networks having two different types of physical characteristics: a broadcast network and a broadband network. Otherwise, individual packages may be created for individual content, and an integrated package composed of the individual packages may be created and transmitted to the terminal.

Figure 17:
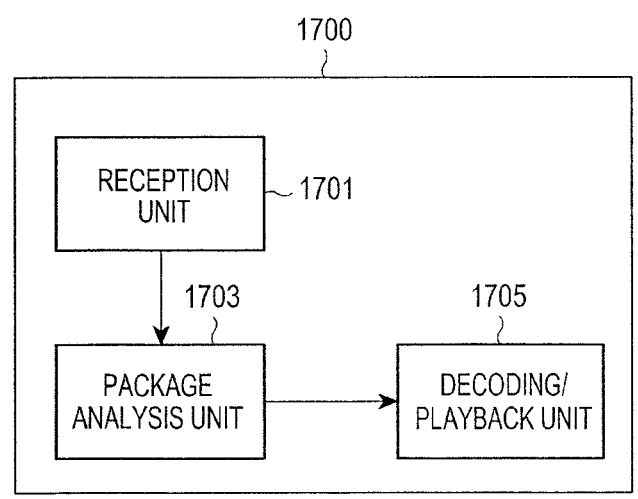
FIG. 17 shows a structure of a reception device according to an exemplary embodiment of the present invention.

FIG. 17 shows a structure of a reception device according to an exemplary embodiment of the present invention.

Referring to FIG. 17, the reception device 1700 may be, for example, a terminal, but the reception device may not be limited to the terminal.

The reception device includes a reception unit 1701, a package analysis unit 1703, and a decoding/playback unit 1705. Although not shown in the drawing, it will be apparent to those of ordinary skill in the art that to perform an operation of the present invention, the reception device has a controller capable of controlling its components.

The reception unit 1701 receives a package including package components configured according to an exemplary embodiment of the present invention.

The package analysis unit 1703 analyzes the received package components. It will be apparent to those of ordinary skill in the art that the received package components are package components which are configured according to an exemplary embodiment of the present invention.

The decoding/playback unit 1705 decodes and plays content based on the analyzed package components.

Although not shown in the drawings, it is possible to record, store and play data depending on the package generated by exemplary embodiments of the present invention. When package components are included in one package, one package may be stored in storage media (e.g., Compact Disc (CD), Digital Versatile Disc (DVD), Database (DB) and Universal Serial Bus (USB)) to include the proposed MMT assets, Configuration information, CI, Transport Characteristics, Package Identification Information, Asset list Information, Rights Management Information, and Transport Timeline Information. During playback, a reception device may play content by analyzing the package components. It is possible to store and play content more easily using the storage media by replacing a URL with storage location information (e.g., a memory address).

As is apparent from the foregoing description, the present invention makes it possible to create package components in the form of a separate package rather than managing them as assets of one package, and to use them in other packages.

Exemplary embodiments of the present invention make it possible to transmit packages over various heterogeneous networks and to efficiently transmit broadcast content.

Exemplary embodiments of the present invention stores MMT packages in a file structure, so that the MMT packages may make good use of the advantages of the flexible and extensile file structure.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a packet by a Moving Picture Experts Group (MPEG) media transport (MMT) transmitting entity in a broadcasting system, the method comprising:
   identifying an MMT asset that is a data unit for which composition information for presentation and delivery characteristic information for delivery is defined, wherein the MMT asset includes at least one media processing unit (MPU), the at least one MPU comprises one of timed media data or non-timed media data, and a first MPU included in the MMT asset is identified by a unique identifier of the MMT asset and a sequence number of the first MPU in the MMT asset;
   generating at least one first MMT packet based on the at least one MPU;
   transmitting the at least one first MMT packet,
   wherein the method further comprises:
   transmitting at least one second MMT packet generated based on the composition information, wherein the composition information includes information for spatial relationship and for temporal relationship among the plurality of MMT assets including the MMT asset; and
   transmitting at least one third MMT packet generated based on the delivery characteristic information, wherein the delivery characteristic information includes loss tolerance information indicating whether or not lossy delivery for the asset is allowed.

2. The method of claim 1,
   wherein an MMT receiving device decodes the at least one first MMT packet to obtain content data included in the at least one MPU and the unique identifier of the MMT asset and a sequence number of the at least one MPU in the MMT asset,
   wherein the MMT receiving device decodes the at least one second MMT packet to obtain the composition information, and
   wherein the MMT receiving device uses the content data and the unique identifier of the first MMT asset and the sequence number of the at least one MPU in the MMT asset obtained from the at least first MMT packet and the composition information obtained from the at least one second MMT packet to present of content associated with the MMT asset.

3. The method of claim 2,
   wherein the MMT receiving device decodes the at least one third MMT packet to obtain the delivery characteristic information,
   wherein in case that the loss tolerance information included in the delivery characteristic information indicates that the lossy delivery for the asset is allowed, the MMT receiving device does not request a re-transmission for the asset, and
   wherein in case that the loss tolerance information included in the delivery characteristic information indicates that the lossy delivery for the asset is not allowed, the MMT receiving device requests the re-transmission for the asset.

* * * * *